United States Patent [19]

Maaz et al.

[11] Patent Number: 5,525,762

[45] Date of Patent: Jun. 11, 1996

[54] BALANCE WITH FORCE SUPPORT

[75] Inventors: Günther Maaz, Uslar; Matthias Eger, Wollbrandshausen; Werner Schulze, Göttingen; Christoph Berg, Göttingen; Michael Müller, Göttingen; Eberhard Lübke, Hardegsen, all of Germany

[73] Assignee: Sartorius AG, Göttingen, Germany

[21] Appl. No.: 370,605

[22] Filed: Jan. 10, 1995

[30] Foreign Application Priority Data

Jan. 19, 1994 [DE] Germany ............ 44 91 412.0

[51] Int. Cl.$^6$ ............................................. G01G 3/08
[52] U.S. Cl. ............ 177/229; 73/862.634; 177/210 EM; 177/210 FP
[58] Field of Search ............ 73/862.634, 862.639; 177/229, 210 EM, 210 FP

[56] References Cited

U.S. PATENT DOCUMENTS

| | | | |
|---|---|---|---|
| 4,300,648 | 11/1981 | Gallo et al. | 177/229 |
| 4,505,345 | 3/1985 | Jetter | 177/229 X |
| 4,509,610 | 4/1985 | Hayashi | 177/229 X |
| 4,678,050 | 7/1987 | Wirth et al. | 177/229 |
| 5,092,416 | 3/1992 | Luechinger et al. | 177/229 |
| 5,183,125 | 2/1993 | Schurr | 177/229 X |
| 5,338,902 | 8/1994 | Uchiike | 177/229 X |
| 5,340,951 | 8/1994 | Hungerbühler et al. | 177/229 |

*Primary Examiner*—Peter S. Wong
*Assistant Examiner*—Randy W. Gibson
*Attorney, Agent, or Firm*—Eric P. Schellin

[57] ABSTRACT

Disclosed is a balance with a first parallel guide (3, 3') which resiliently connector a load receiver (2) to an area (5, 5') fixed to the housing and which is resiliently deformed under the influence of the weight to be measured, and with a second, softer parallel guide (8) which is connected by its one end to the load receiver (2) and by its other (11) end via a force receiver which is at least approximately without displacement to the area (5, 5') fixed to the housing and which transfers as a result thereof a fraction of the force of the weight onto the force measuring receiver that both parallel guides (3, 3', 8) exhibit at least approximately the same height and the same length and are arranged close to one another laterally. The second parallel guide is advantageously locate between two partial areas (3, 5, and 3', 5') of the first parallel guide.

7 Claims, 6 Drawing Sheets 5,525,762

BALANCE WITH FORCE SUPPORT

The invention relates to a balance with a first parallel guide which resiliently connects a load receiver to an area fixed to the housing and which is elastically deformed under the influence of the weight to be measured, and with a second, softer parallel guide which is connected by its one end to the load receiver and by its other end via a force receiver which is at least approximately without displacement to the area fixed to the housing and which transfers as a result thereof a fraction of the force of the weight onto the force measuring receiver.

A balance of this type is known from EP 0,248,226. Here the second parallel guide is arranged in the inner area of the first parallel guide. The second parallel guide is therefore lower and shorter than the first parallel guide. The compensation of length during the deflection of the parallel guides under load describe in EP 0,248,226 is therefore only partially realized. Even the compensation of the spring creep of the two parallel guides is not optimal on account of the differing specific material loading of the two parallel guides. Moreover, the manufacture of the two parallel guides from a single block is relatively expensive since the contours of each parallel guide most be milled individually from the block.

In addition, a balance with a load receiver with parallel guidance by means of leaf springs is known from EP 0,188,997 in which the change of the position and angle of the middle of the leaf springs acts on a rigid measuring system by means of elastic transfer parts and thus transfers a fraction of the force of the weight onto the measuring system.

The invention therefore has the objective of further developing a balance of the type initially described in such a manner that an improved operation and, in particular, a simpler manufacture are achieved.

The invention solves this objective in that both parallel guides exhibit at least approximately the same height and the same length and that both parallel guides are arranged close to one another laterally.

As a result of the design of the invention both parallel guides are identical of substantially identical in their cross section. As a result thereof their force reduction ratio is also very constant. Moreover, both parallel guides can be milled from a block in one work step or produced from an extruded profile and the separation takes place by means of a single vertical milling or by a vertical saw cut.

An especially advantageous embodiment results if the first parallel guide is subdivided into two partial areas and the second parallel guide is located in the middle between these two partial areas. This yields a symmetric design and the corner loaded problems are minimized.

Further advantageous embodiments result from the subclaims.

The invention is described in the following with reference made to the schematic figures.

DETAILED DESCRIPTION OF THE DRAWINGS

Figure 1:
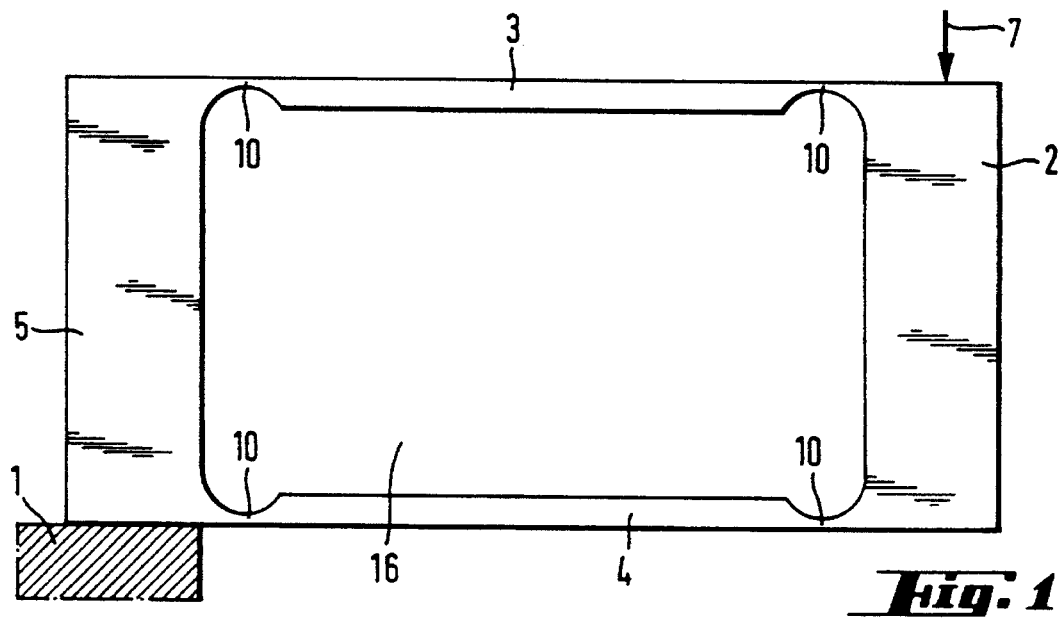
FIG. 1 shows a side view of the parallel guide.
Figure 2:
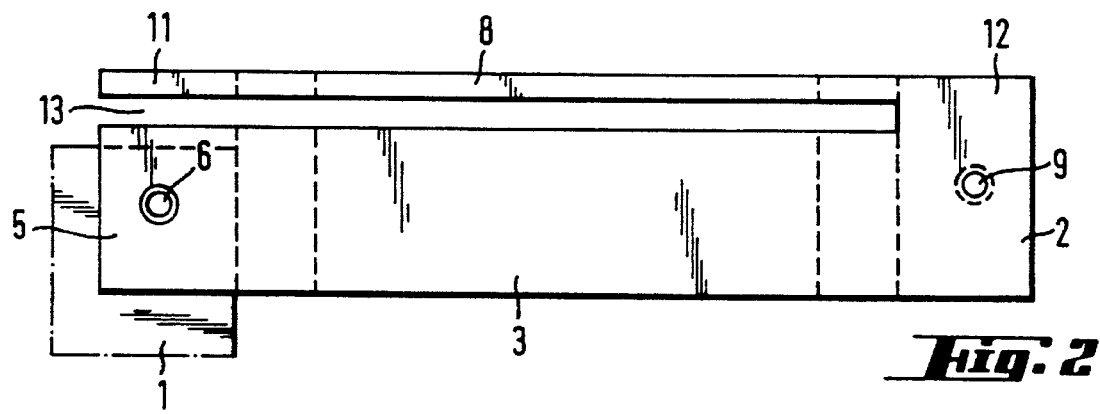
FIG. 2 shows a top view of the parallel guide in a first embodiment.

A first embodiment of the parallel guide is shown in FIG. 1 in a side view and in FIG. 2 in a top view. Upper guide rod 3 and lower guide rod 4 connect load receiver 2, which carries the balance scale (not shown), resiliently to area 5 fixed to the housing. Both guide rods 3, 4 thus form a parallel guide for load receiver 2. Area 5 comprises threaded hole 9 for fastening the balance scale. Under the influence of a load on the balance scale—indicated by arrow 7 in FIG. 1—guide rods 3, 4 and resiliently deflected with the main part of the elastic deformation taking place in the area of thin areas 10. Loaded receiver 2 is lowered thereby. This lowering is transferred onto the second parallel guide, which is directly connected by its one end 12 to loaded receiver 2. In FIG. 2 only upper guide rod 8 can be recognized of the two guide rods of the second parallel guide. The other end 11 of the second parallel guide is connected by a force receiver without displacement described further below to area 5 fixed to the housing and is therewith held permanently to the housing. As a result thereof the second parallel guide is bent resiliently exactly as the first parallel guide; however, the force acting on the force receiver is only a fraction of the weight force impinging the load receiver. If both parallel guides are exactly of the same height and equally long and if thin areas 10 are also exactly equal in cross section their force constants are proportional to their width and the reduction of force is given by the ratio of the width of the second parallel guide to the total width of the first and of the second parallel guide.

The two parallel guides are advantageously manufactured from a single block into which inner hollow area 16 in FIG. 1 is milled. Instead of this, it is also possible to manufacture the contour of FIG. 1 directly as an extruded profile. The partial separation and the subdivision into the two parallel guides then takes place by means of a single vertical saw cut 13.

Figure 3:
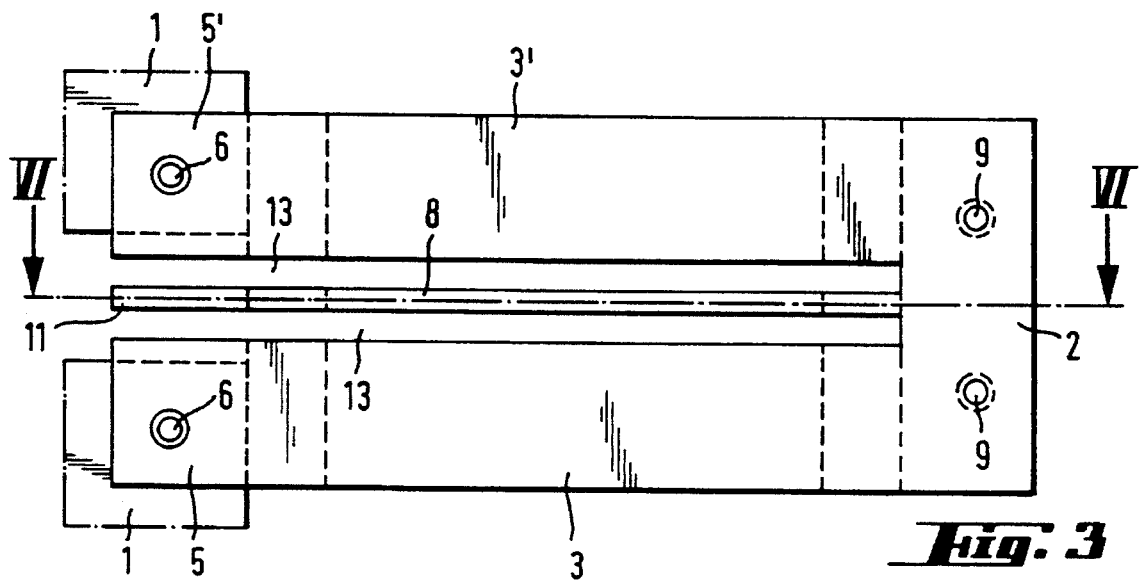
FIG. 3 shows a top view of the parallel guide in a second embodiment.

The asymmetry of this arrangement of the two parallel guides is disadvantageous for the corner load freedom of the balance; therefore, a symmetric arrangement in accordance with FIG. 3 is preferred instead of the arrangement in FIG. 2. The side view of FIG. 1 also applies to this arrangement according to FIG. 3. The first parallel guide is divided thereby into two partial areas of which upper guide rods 3 and 3' can be recognized in FIG. 3. The second, narrower parallel guide 8 is located in the middle between these two partial areas 3 and 3' of the first parallel guide.

The two vertical separating slot 13 can be manufactured by sawing or by milling. A through bore is provided on each of the two partial areas 5 and 5' of the first parallel guide for fastening to housing 1. Two threaded holes 9 are provided in load receiver 2 for the fastening of the balance scale.

Figure 4:
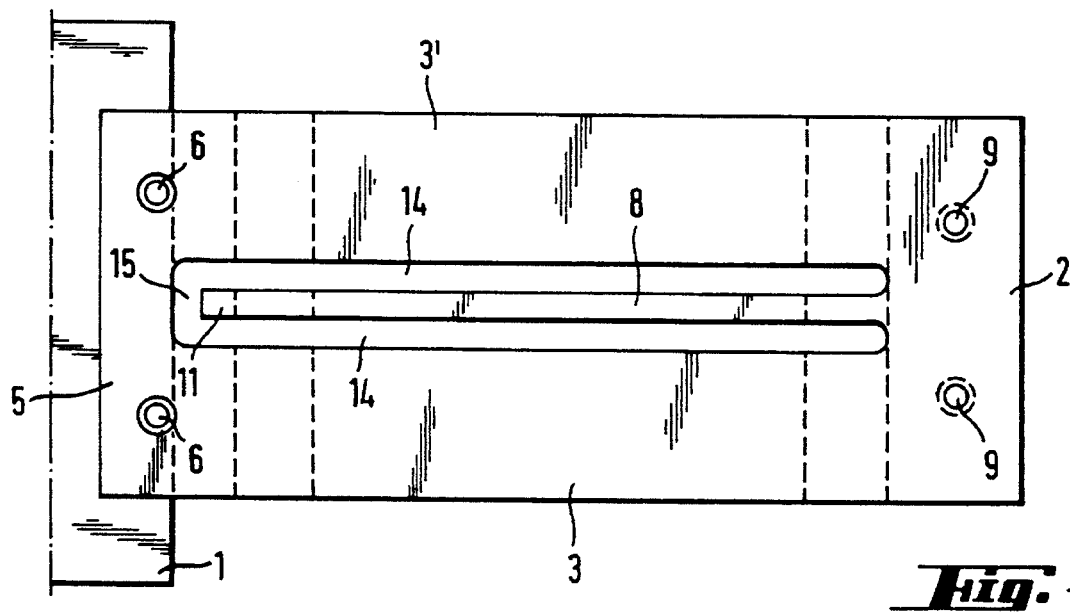
FIG. 4 shows a top view of the parallel guide in a third embodiment.

FIG. 4 shows a third variant similar to the variant of FIG. 3. Here, a single U-shaped separating slot 14 is provided instead of the two separating slots 13, which slot 14 separates the first parallel guide from the second parallel guide. Separating slot 14 is manufactured e.g. by milling. Turning area 15 of separating slot 14 is arranged so far to the left that at left end 11 of the second parallel guide a connecting web remains between upper guide rod 8 an the lower guide rod. This design of FIG. 4 has the advantage that area 5 of the first parallel guide, which area is fixed to the housing, is more stable. In the design of FIG. 3 the necessary connecting stability of the two partial areas 5 and 5' of the first parallel guide must be assured by housing 1 below the two fastening points 6.

The corner-loaded adjustment of the first parallel guide takes place in a known manner either by removing material in the area of thin areas 10 (in FIG. 1) or by resilient bracing by means of four applying screws.

Figure 5:
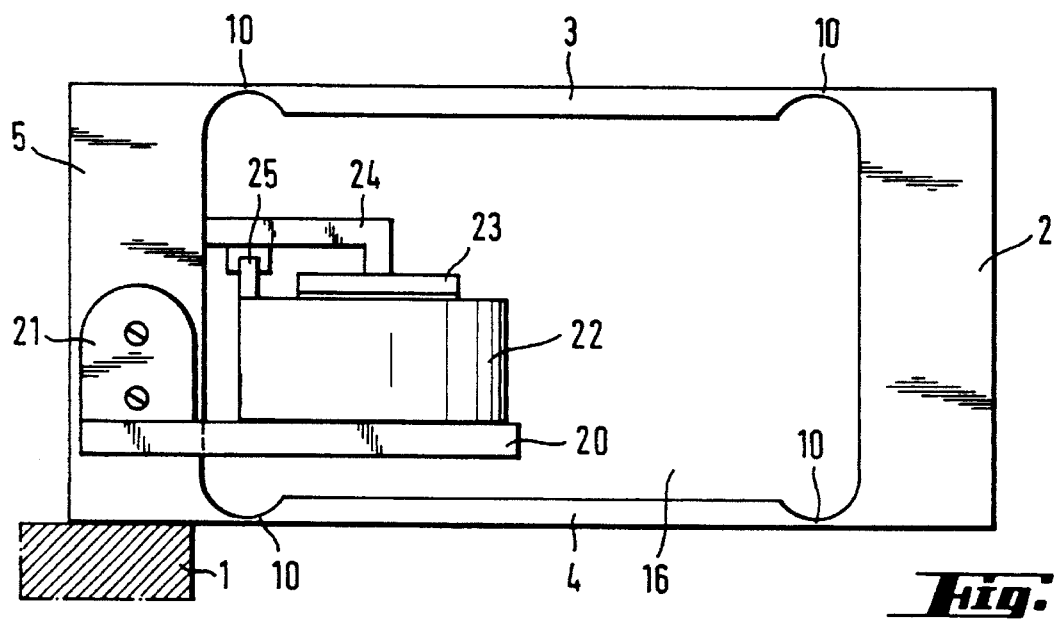
FIG. 5 shows a side view of the parallel guide with a force receiver in accordance with the principle of the electromagnetic compensation of force.
Figure 6:
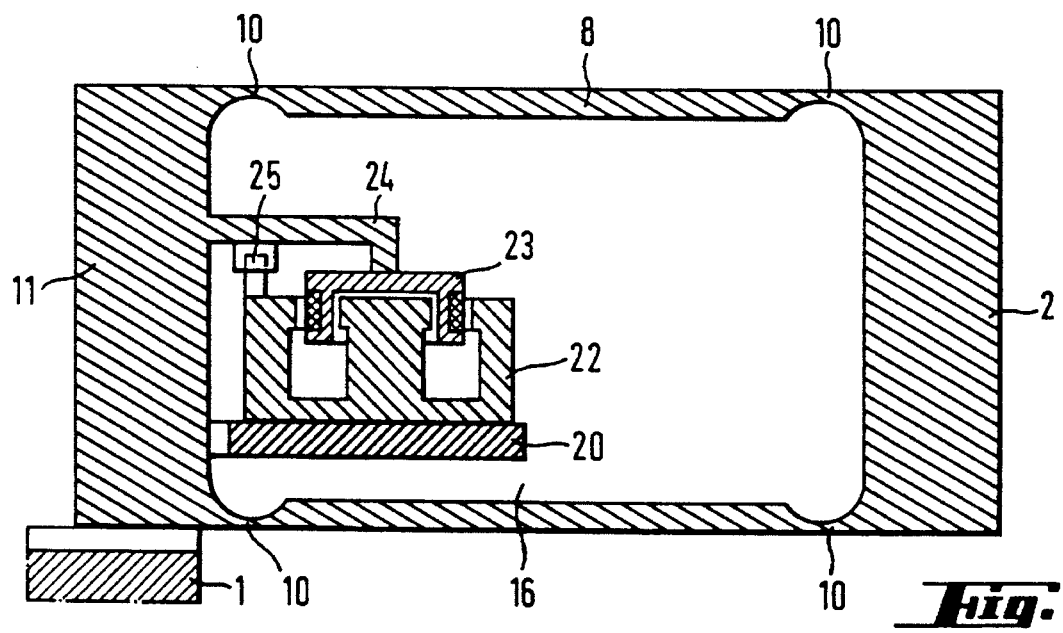
FIG. 6 shows a section through the parallel guide along line VI–VI in FIG. 3 and a section through the force receiver in accordance with the principle of the electromagnetic compensation of force in FIG. 5.

The force receiver and its inclusion into the two parallel guides is shown in a first example in FIGS. 5, 6. The embodiment of the parallel guides according to FIGS. 1, 3 is assumed thereby. FIG. 5 is a side view and FIG. 6 a vertical section along line VI–VI in FIG. 3. Projecting arm 20 is fastening via piece 21 to area 5 fixed to the housing, which arm is also supported on the other area 5' fixed to the housing by a piece corresponding to piece 21. Projecting arm 20 carries permanent magnet 22 into the air gap of which coil 23 extends. Coil 23 is connected via cantilevered bracket 24 to end area 11 of the second parallel guide. Position sensor 25 controls the current through coil 23 in such a manner that coil 23 and magnet 22 retain their relative position to one another; as a result thereof, the position of end 11 of the second parallel guide is also retained relative to areas 5, 5' fixed to the housing without a mechanical connection being present. The coil current necessary for position control is then a measure for the force attacking end 11 of the second parallel guide. The principle of the electromagnetic compensation of force is generally known in the weighing art so that a detailed explanation can be dispensed with here. It is likewise generally known that the fastening points for pieces 21 and the position of position sensor 25 can be selected in such a manner that the unavoidable, slight bending of areas 5, 5' fixed to the housing under a corner load has no effect on the result of weighing.

Figure 7:
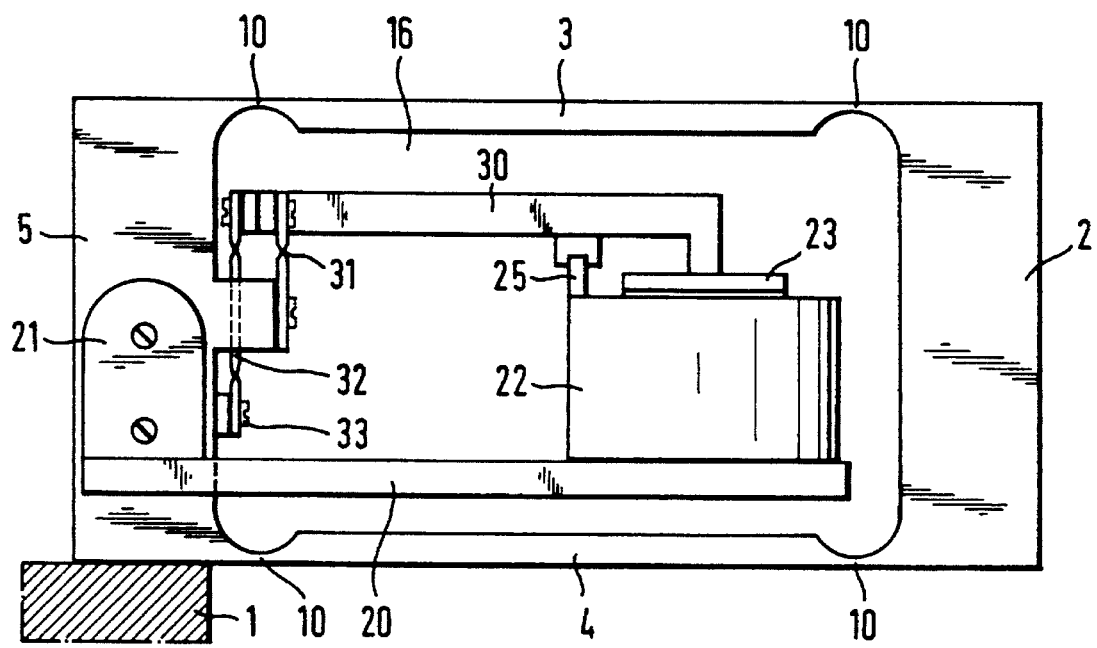
FIG. 7 shows a side view of the parallel guide with a force receiver in accordance with the principle of the electromagnetic compensation of force with an additional translation lever.

FIG. 7 shows an embodiment of the force receiver similar to the embodiment of FIGS. 5 and 6 but with an additional translation lever. Translation lever 30 is carried on areas 5, 5', which are fixed to the housing, by leaf spring articulations 31. The short lever arm of this translation lever is formed by the distance of tension member 32 from leaf spring articulation 31. The end of tension member 32 is connected (screw 33) to end 11 of the second parallel guide. Coil 23 of the electromagnetic compensation of face is fastened to the longer lever arm of translation lever 30. Permanent magnet 22 and position sensor 25 are identical to the corresponding parts in FIGS. 5 and 6. Projecting arm 20 is extended in order to carry magnet 22. The load on load receiver 22 is transferred in this embodiment onto tension member 32, reduced in correspondence with the elasticity constants i.e., spring stiffnesses of the first and of the second parallel guides. Translation lever 30 reduces this force again in the ratio of its two lever arms so that only a very slight force must be electromagnetically generated on coil 23. That is, both coil 23 as well as permanent magnet 22 can be designed to a small and, also, only small currents are required for the compensation of force.

Figure 8:
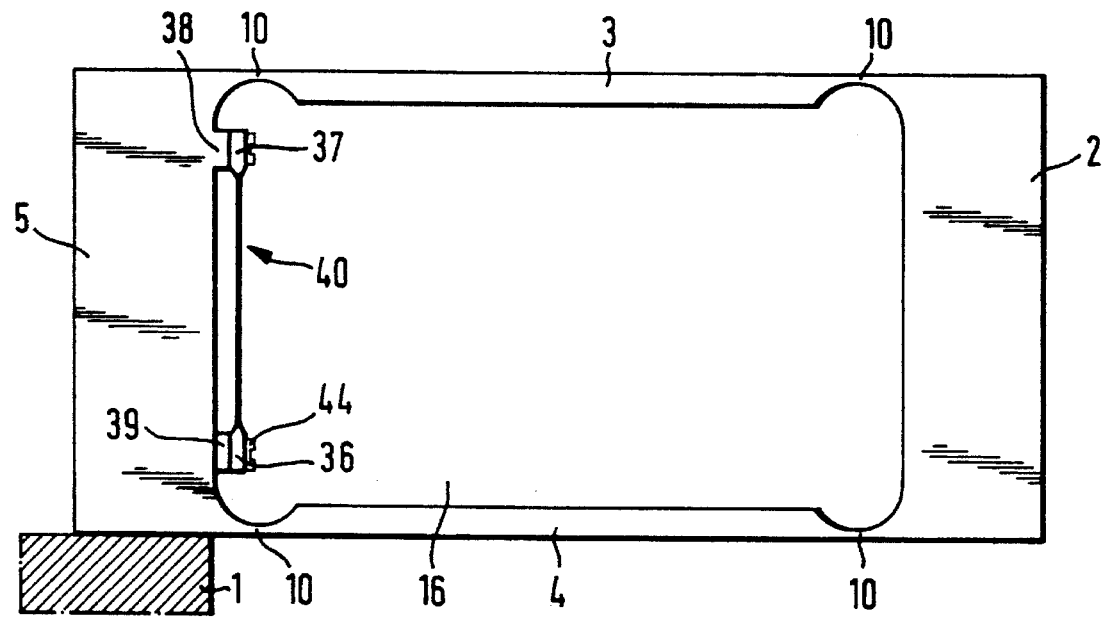
FIG. 8 shows a side view of the parallel guide with an oscillator as force receiver.
Figure 9:
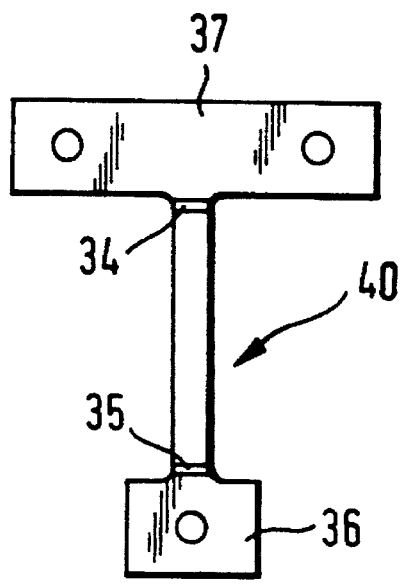
FIG. 9 shows a top view of the oscillator.

FIG. 8 shows the force-reducing parallel guide together with an oscillator as force receiver. The first and second parallel guides are designed as in the previous examples. Cross traverse 37 of mechanical oscillator 40 is fastened at the two areas 5, 5', which are fixed to the housing, to projection 38. Oscillator 40 is shown in a top view in FIG. 9. Stable cross traverse 37 merges at 34 into a thinner area which for its part merges at 35 into a thicker and wider screw area 36. Screw area 36 is fastened by screw 44 to projection 39 at end 11 of the second, softer parallel guide. When load receiver 2 is loaded a fraction of the force of the weight is therefor transferred onto oscillator 40 and elevates its oscillating frequency in a known manner. This frequency change can be evaluated in a direct, digital manner. The method of operation of a mechanical oscillator is also generally known in balance construction so that details such as e.g. the excitation of oscillation do not have to be explained.

Figure 10:
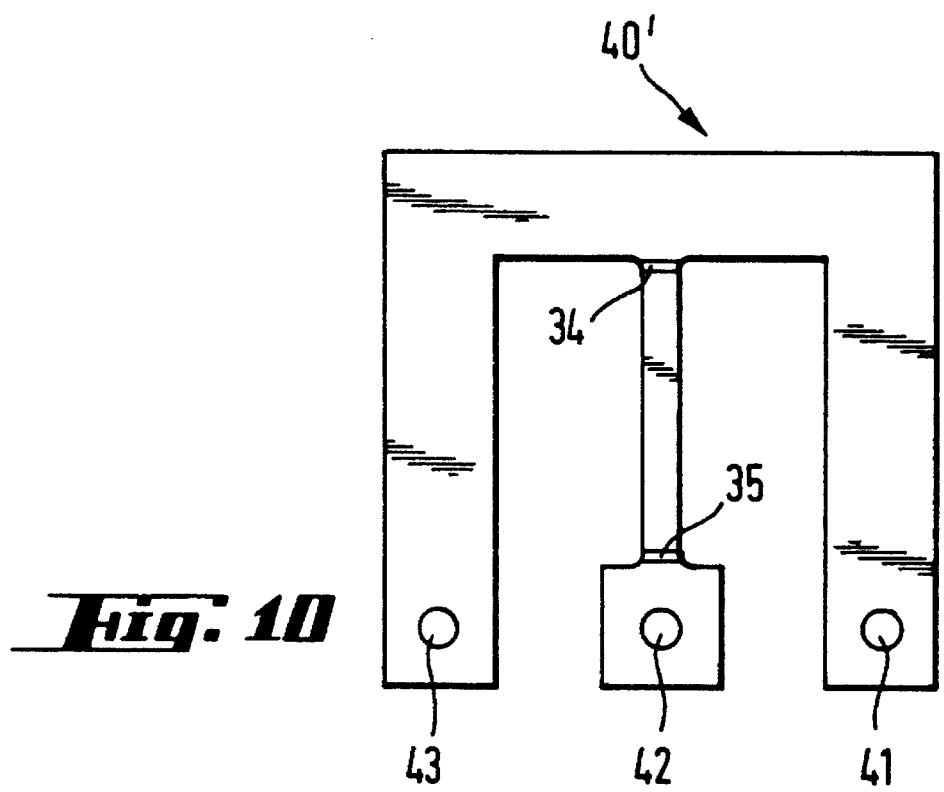
FIG. 10 shows a top view of the oscillator in a second embodiment.

FIG. 10 shows a second embodiment of the mechanical oscillator in a top view. This oscillator 40' is fastened in the same manner as is shown in FIG. 8 to the force-reducing parallel guide, only in this instance all three screw points 41, 42 and 43 are at the same height. As a result, the projections, designated in FIG. 8 with 38 and 39, on parts 5, 5', which are fixed to the housing, as well as on part 11 of the second parallel guide are at the same height and can be directly taken into consideration when milling out inner area 16 or in the case of the extruded profile. Moreover, different coefficient of expansion of the oscillator material and of the material of the parallel guide do not result in a distortion.

Figure 11:
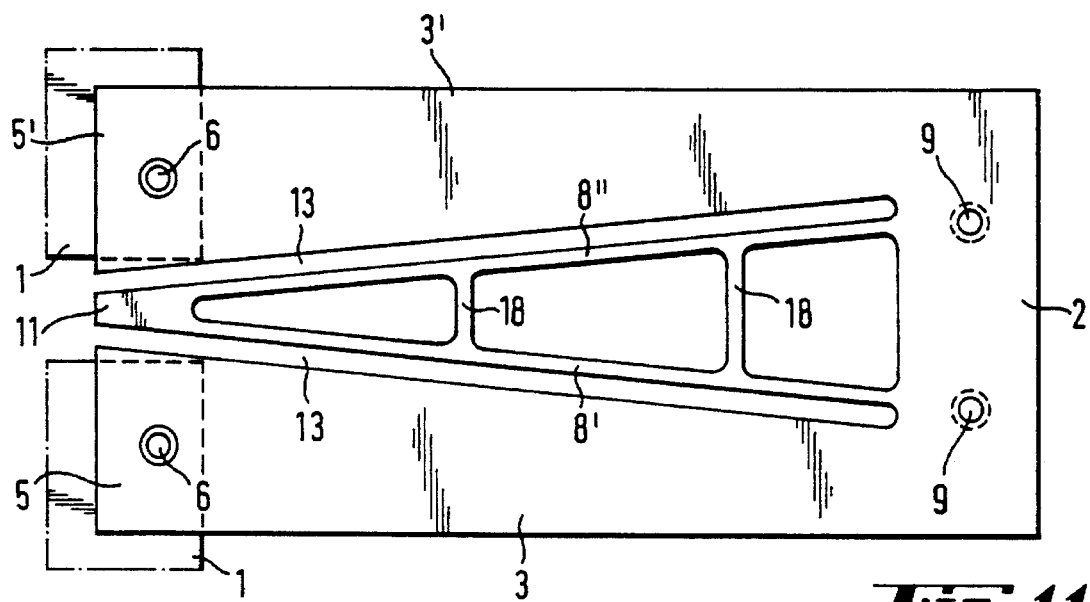
FIG. 11 shows a top view of the parallel guide in a fourth embodiment.
Figure 12:
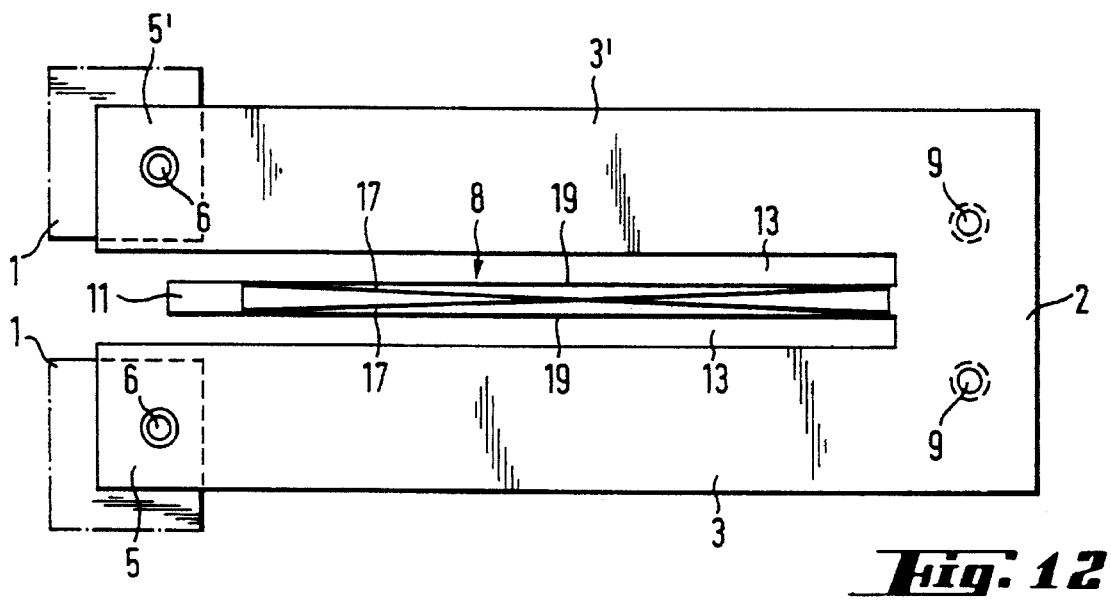
FIG. 12 shows a top view of the parallel guide in a fifth embodiment.

FIGS. 11 and 12 show two further embodiments of the force-reduced parallel guides. These two embodiments furnish two examples of how the width of the second parallel guide can be kept very narrow without its lateral stability becoming too small. In FIG. 11 the second parallel guide consists of two webs 8' and 8" which are arranged in a V-shape with one another and form the two shanks of a trapezoid. Cross webs 18 connect the two webs 8' and 8' and increase the stability without contributing to the elasticity constant of the parallel guide. In FIG. 12 the two outer webs 19 and the two diagonal webs 17 are so narrow that they only appear as a line in the drawing. The diagonal webs produce a design like a latticework which, in spite of the slight width of the individual webs, assures sufficient lateral stability.

If the ratio of the elasticity constants between the first parallel guide and the second parallel guide achievable via the variation in width is insufficient, that is, if one desires to achieve greater reductions in force, it is of course possible to select thin areas 10 in second parallel guide 8 to be thinner than in the first parallel guide ¾. Since the thickness of thin areas enters into the elasticity constant with its power raised to the third power, very high force-reduction ratios can be achieved vary rapidly. This can be achieved in the manufacture as follows: Inner hollow space 16 is selected to be the same for both parallel guides whereas in the area of the second parallel guide 8 a little material is removed from the outside, which makes its thin areas thinner.

Figure 13:
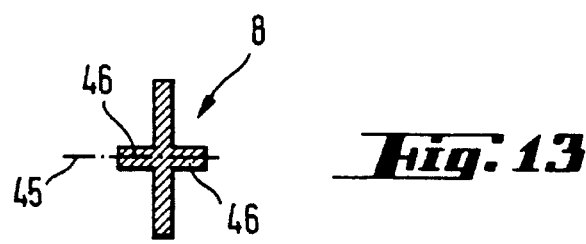
FIG. 13 shows a cross section through a guide rod of the parallel guide in a special embodiment.

The guide rods (e.g. 3 and 4 in FIG. 1) are always shown in the above with thin areas 10 at their ends. Naturally, guide rods can also be used which exhibit a constant thickness over their entire length, whose elasticity is therefore distributed over their entire length. The cross section of the guide rods, which has always been assumed to be rectangular up to the present, can also be designed to be e.g. in the shape of a cross, as is shown in FIG. 13 on an enlarged scale. If the guide rods of second parallel guide 8 are designed in this manner the two lateral widened-out areas 46 increase the lateral stability considerably but have hardly any effect on the elasticity constant in a vertical direction since they are located in the area of neutral axis 45 and their low height enters only with the third power.

It is furthermore possible to use the additional translation lever, as it is shown in FIG. 7, together with the mechanical oscillator of FIG. 8. The use of any force receivers desired is also possible, provided that they operated practically without travel.

We claim:

1. In a weighing balance with a first elongated parallel guide (3, 4) which resiliently connects a load receiver (2) to an area (5) fixed to the housing and which is resiliently deformed under the influence of a weight to be measured, and with a second elongated parallel guide (8) which is connected at one end (12) to the load receiver (2) and at the opposite end (11) to a force receiver which is without substantial displacement to said area (5) whereby there is transferred a portion of the weight onto the said force measuring receiver, comprising wherein both said first elongated parallel guided (3, 4) and second elongated parallel guide possess substantially an identical width and substantially an identical length, said elongated parallel guide (3, 4) comprise two portions (3, 3') having a space therebetween and the second parallel guide 8 is mounted in the said space defined by the two said portions (3, 3') of the said elongated parallel guide.

2. The balance according to claim 1, wherein both parallel guides (3, 4, 8) are manufactured from a single block and are separated from one another by at least one vertical slot (13, 4).

3. The balance according to claim 2, wherein the block is extruded.

4. The balance according to one of claims 1, 2, or 3, wherein the first parallel guide (3, 4) is wider than the second parallel guide (8).

5. The balance according to one of claims 1, 2, or 3, wherein a system which compensates force electromagnetically is used as a force receiver which is substantially without displacement.

6. The balance according to one of claims 1, 2, or 3, wherein the second parallel guide (8', 8") has a V-shape when viewed from above.

7. The balance according to one of claims 1, 2, or 3, wherein the second parallel guide is subdivided into several struts (17, 19) to form a latticework when viewed from above.

* * * * *